United States Patent
Heinrich et al.

(10) Patent No.: US 11,095,203 B2
(45) Date of Patent: Aug. 17, 2021

(54) HIGH-FREQUENCY LINE FILTER

(71) Applicant: DR. JOHANNES HEIDENHAIN GmbH, Traunreut (DE)

(72) Inventors: Simon Heinrich, Traunstein (DE); Franz Gramsamer, Fridolfing (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 15/931,959

(22) Filed: May 14, 2020

(65) Prior Publication Data
US 2020/0366185 A1    Nov. 19, 2020

(30) Foreign Application Priority Data

May 14, 2019 (DE) ...................... 10 2019 112 598.7

(51) Int. Cl.
*H02M 1/12* (2006.01)
*H02J 3/01* (2006.01)
*H02M 1/32* (2007.01)

(52) U.S. Cl.
CPC .............. *H02M 1/126* (2013.01); *H02J 3/01* (2013.01); *H02M 1/322* (2021.05)

(58) Field of Classification Search
CPC .. H02M 1/12; H02M 1/126; H02M 2001/322; H02M 1/44; H02J 3/01
See application file for complete search history.

(56) References Cited

U.S. PATENT DOCUMENTS 5,969,583 A * 10/1999 Hutchison .............. H03H 7/427
                                                            333/12
7,027,314 B2 * 4/2006 Soto ........................ H02M 1/12
                                                            363/39

(Continued)

FOREIGN PATENT DOCUMENTS

DE     102007022503 A1    11/2008
EP        1069673 B1       1/2001

OTHER PUBLICATIONS

Akagi, H. et al., "A passive EMI filter for an adjustable-speed motor driven by a 400-V three-level diode-clamped inverter" 2004 35th Annual IEEE Power Electronics Specialists Conference (Jun. 2004) pp. 1-8.

(Continued)

*Primary Examiner* — Fred E Finch, III
(74) *Attorney, Agent, or Firm* — Carter, DeLuca & Farrell LLP

(57) ABSTRACT

In a high-frequency line filter for a converter, the converter has three phase connections for receiving a three-phase alternating signal from a three-phase voltage network and is adapted to convert the received three-phase alternating signal into an output signal for a load. The high-frequency line filter includes: a first filter path for establishing a conductive connection between a first phase connection of the three phase connections and a ground connection; a second filter path for establishing a conductive connection between a second phase connection of the three phase connections and the ground connection; and a third filter path for establishing a conductive connection between a third phase connection of the three phase connections and the ground connection. The high-frequency line filter includes a series connection of a pulse-proof capacitor and a parallel connection of at least (Continued)

two Y capacitors, the series connection being provided in each filter path.

15 Claims, 3 Drawing Sheets

(56) References Cited

U.S. PATENT DOCUMENTS

| | | | | |
|---|---|---|---|---|
| 7,667,988 | B2* | 2/2010 | Haeberle | H02M 1/44 |
| | | | | 363/39 |
| 8,680,949 | B2 | 3/2014 | Bohm et al. | |
| 9,912,222 | B2* | 3/2018 | Marahrens | H02M 1/126 |
| 10,608,556 | B2* | 3/2020 | Smidt | H02M 7/797 |
| 10,879,826 | B1* | 12/2020 | Vrankovic | H02M 1/12 |
| 2004/0062064 | A1* | 4/2004 | Pelly | H02M 1/126 |
| | | | | 363/100 |
| 2013/0033913 | A1* | 2/2013 | Sparka | H01G 4/228 |
| | | | | 363/132 |
| 2013/0057297 | A1 | 3/2013 | Cheng et al. | |
| 2015/0222170 | A1* | 8/2015 | Berger | H02M 1/00 |
| | | | | 363/40 |
| 2016/0164448 | A1 | 6/2016 | Kane | |
| 2016/0308399 | A1* | 10/2016 | Nakamura | H02J 50/12 |
| 2017/0302165 | A1* | 10/2017 | Marcinkiewicz | H02M 7/06 |
| 2019/0199194 | A1* | 6/2019 | Nikitin | H02M 7/219 |
| 2021/0050770 | A1* | 2/2021 | Gotzelmann | H02M 7/53871 |

OTHER PUBLICATIONS

European Search Report issued in corresponding EP Application No. 201584885, dated Aug. 31, 2020, pp. 1-2.
Impuls-Kondensatoren—WIMA (www.wima.de/de/produkte/impulskondensatoren/) (Copyright date: 2020).

* cited by examiner

HIGH-FREQUENCY LINE FILTER

CROSS-REFERENCE TO RELATED APPLICATIONS

The present application claims priority to Application No. 10 2019 112 598.7, filed in the Federal Republic of Germany on May 14, 2019, which is expressly incorporated herein in its entirety by reference thereto.

FIELD OF THE INVENTION

The present invention relates to a high-frequency line filter, e.g., for a converter connected to a supply network, and to a converter network having a high-frequency line filter and a converter.

BACKGROUND INFORMATION

Converters convert an input signal on the basis of a power electronic circuit into an output signal. The power electronic circuit includes a power semiconductor switch or a plurality of power semiconductor switches such as a MOSFET or an IGBT, operated at a switching frequency that may be in the range of a few kHz.

Converters such as inverters or rectifiers are able to be coupled to the public supply network on the one hand and supply the system voltage to additional components such as an additional converter and/or a load such as a motor, possibly after prior filtering or a passive rectification. Moreover, certain converters are arranged not only to receive energy from the supply network and to convey it to a load but also to recover energy, e.g., excess braking energy of a motor, and feed it into the supply network. Such converters are referred to as regenerative converters.

Filters are often provided to attenuate interference signals, e.g., to comply with limit values for radiation and RFI voltage measurements. These filters may be coupled to the feeder line between the supply network and the converter or they may be integrated into the converter itself. Filters of this type often have a passive configuration and typically include a network of passive components, such as capacitors, coils, and resistors. The interference signals may particularly occur as a result of the high-frequency operation of the power semiconductor switches of the converter.

For example, a filter of the aforementioned type is described in European Patent No. 1 069 673 for a three-phase device. The filter includes a network of capacitors and coils, which couples the power connections on the one hand and the phase inputs of the device on the other hand both to a ground connection and to a neutral conductor. This network thus is arranged between the power connections and the phase inputs of the device. This is why the filter is also referred to as a line filter.

German Published Patent Application No. 10 2007 022 503 describes another example of a line filter for a converter for connecting the converter to a three-phase voltage network.

SUMMARY

Example embodiments of the present invention provide a filter for a converter, which is able to be produced in a cost-effective manner and has improved filter characteristics as well as a compact configuration.

Furthermore, example embodiments of the present invention provide a converter network having a correspondingly improved filter.

According to an example embodiment of the present invention, a high-frequency line filter for a converter is provided. The converter has three phase connections for receiving a three-phase alternating signal from a three-phase voltage network and is adapted to convert the received three-phase alternating signal into an output signal for a load. The high-frequency line filter includes a first filter path for establishing a conductive connection between a first phase connection of the three phase connections and a ground connection, a second filter path for establishing a conductive connection between a second phase connection of the three phase connections and the ground connection, and a third filter path for establishing a conductive connection between a third phase connection of the three phase connections and the ground connection. The high-frequency line filter includes a series connection of a pulse-proof capacitor and a parallel connection of at least two Y capacitors, the series connection being provided in each of the three filter paths.

According to an example embodiment of the present invention, a high-frequency line filter is provided for a converter. The converter has phase connections to receive an alternating signal from a voltage network or to inject an alternating signal into a voltage network. The high-frequency line filter includes a first filter path for establishing a conductive connection between a first phase connection of the phase connections and a ground connection and a second filter path for establishing a conductive connection between a second phase connection of the phase connections and the ground connection. The high-frequency line filter includes a series connection of a pulse-proof capacitor and a parallel connection of at least two Y capacitors, the series connection being provided in each of the filter paths. The alternating signal may be a single-phase alternating signal. For example, precisely two phase connections and two filter paths are provided. Similar to the above-described example embodiment, the alternating signal may also be a three-phase alternating signal. A different phase number is possible as well. For example, at least one phase connection is provided for each phase, and each phase connection is coupled to the ground connection via a filter path.

According to a further example embodiment of the present invention, a converter network includes a converter and a high-frequency line filter, as described above, connected to the converter.

The converter of the converter network may be arranged as a rectifier or an inverter or a combination thereof, which receives the single-phase or multi-phase alternating signal and converts it into a DC output voltage or into an alternating output voltage for a load. The converter may be arranged as a recuperative converter, that is to say, the converter may be configured to inject energy (e.g., excess braking energy of a load in the form of a motor) it receives from outside the voltage network into the voltage network.

The converter may be arranged as a line converter, e.g., the converter converts supplied energy that is made available by a wind-turbine generator or a photovoltaic module or other source, for example, into a single-phase or multi-phase alternating signal and feeds it into the voltage network via the phase connections.

Because of the use of Y capacitors as well as pulse-proof capacitors, it is not only possible to bridge an insulation of the converter but also to filter periodically recurring square-wave pulses with a frequency that corresponds to the switching frequency of the converter.

The Y capacitors, for example, are approved for bridging an insulation. However, they normally do not tolerate the square-wave pulses that are typical of converters. This is the reason for providing the pulse-proof capacitor in series with the parallel connection of the at least two Y capacitors in each filter path. Because of the parallel connection of two Y capacitors, which may each have the same capacitance, the current flowing through the pulse-proof capacitor is at least halved for the Y capacitors.

In this context, the term "Y capacitor" is used according to its usual meaning. Therefore, Y capacitors are capacitors according to the IEC 60384-14 standard, for example. Y capacitors are thus connected between the phase (or a neutral conductor) and a touchable, grounded housing and therefore bridge a basic insulation, e.g., by bridging a dual or reinforced insulation. Only capacitors that have a verifiable greater electrical and mechanical safety at a limited capacitance are considered Y capacitors under this standard. For example, if Y capacitors are operated within their specification, then it will be ensured that they assume the safe, open state in the event of a component failure.

In this context, the term "pulse-proof capacitor" is also used according to its usual meaning. In contrast to Y capacitors, a correspondingly configured connection between an electrode coating and a Schoop coating ensures a high current and pulse load capacity in pulse-proof capacitors, for example. Pulse-proof capacitors are usually not approved for bridging insulations. Exemplary pulse-proof capacitors include conventional pulse capacitors by WIMA (see, e.g., www.wima.de/de/produkte/impulskondensatoren/).

The high-frequency line filter may be directly connected to the phase connections of the converter through its filter paths, and is consequently connected in close proximity thereto. For example, the filter paths are in contact with the phase connections of the converter and are not coupled to these phase connections via further electrical/electronic components, for example.

The converter may be operated on the basis of power electronic semiconductor switches using high switching frequencies that may are in the range of a few kilohertz and even higher.

The converter may be arranged as a step-up converter that converts the, for example, three-phase alternating signal, e.g., from the likewise three-phase voltage network (also denoted as supply network in this context), into an output signal in the form of a DC output voltage. This DC output voltage may be supplied to a DC voltage intermediate circuit to which a further converter such as an inverter may be connected downstream, which converts this DC voltage of the DC voltage intermediate circuit into an alternating voltage for a load, e.g., a motor.

The converter may be configured to recover energy, which means that the converter feeds excess energy into the three-phase voltage network.

In this context, reference is made to the introductory statements made above. The high-frequency line filter described herein is not restricted to any particular converter types. In any event, the converter is coupled with the voltage network, and in order to satisfy its converter function, e.g., its conversion functions, it includes at least one switch such as a power semiconductor switch, which is operated at a switching frequency that is considerably above the line frequency (e.g., 50 Hz), such as in the range of a few kHz.

This high-frequency switching operation of the converter as well as its coupling to the voltage network requires the high-frequency line filter.

The high-frequency line filter may be provided outside the housing of the converter and may bridge the insulation of the converter, in particular, via the Y capacitors. The high-frequency line filter may be integrated into the converter. Moreover, the high-frequency line filter may be partially integrated into the converter and partially situated outside the converter.

The supply network supplies the alternating signal at the corresponding supply connections. Before the alternating signal is received by the phase connections of the converter, it typically first passes through a line filter and/or a commutation circuit. This applies in a similar manner to an alternating signal that the converter feeds into the supply network. Thus, it first passes through the commutation circuit, for example, and then through the line filter prior to reaching the supply network via the supply connections.

Each phase connection of the converter is connected to ground by the filter paths.

In order to reduce the current in the Y capacitors, it is also possible to provide more than two Y capacitors in the parallel connections of the filter paths in each case.

For example, all Y capacitors have the same capacitance. This capacitance is in the range of 1 nF to 10 nF or in the range of 2 nF to 5 nF, for example.

The pulse-proof capacitors in the filter paths may also have the same capacitance in each case. For example, this capacitance is in the range of 1 nF to 10 nF, or in the range of 1 nF to 4 nF.

Each filter path may have an ohmic damping resistor having a resistance value of 1 to 10 ohm or of 2 to 8 ohm, or of 3 to 7 ohm, for example. The damping resistor is arranged in series with the pulse-proof capacitor. The ohmic damping resistor in each filter path may be arranged between the respective phase connection of the converter and the pulse-proof capacitor.

In order to comply with safety regulations, the high-frequency line filter may additionally include discharge resistors. For example, a first ohmic discharge resistor, which is arranged in parallel with the at least two Y capacitors, is provided in each filter path. In addition, a second ohmic discharge resistor, which is arranged in parallel with the pulse-proof capacitor, may be provided in each filter path.

In the case of a three-phase configuration, the converter may form a star point (which is not identical with a star point that may possibly be formed by a motor which is post-connected to the converter). For example, the high-frequency line filter includes a fourth filter path, which establishes a conductive connection between this star point formed by the converter and the ground connection. This optional, fourth filter path includes a series connection made up of an ohmic damping resistor and a parallel connection of at least two Y capacitors. A pulse-proof capacitor is not necessarily provided in the fourth filter path, the reason being that the interfering pulses at the star point typically have a lower amplitude than those at the phase connections. To satisfy safety regulations, a discharge resistor may likewise be connected in parallel with the at least two Y capacitors in the fourth filter pass.

In certain arrangements, the high-frequency line filter does not include interconnected inductors. Because of the spatial extension of the high-frequency line filter, it has an unavoidable lower leakage inductivity. However, no inductors in the form of discrete components are interconnected in the high-frequency line filter in this particular configuration.

In addition to the converter and the high-frequency line filter connected thereto, the converter network may include a line filter, which forms a coupling between the voltage network and the three phase connections of the converter. An inductive commutation circuit, which is connected between the line filter and the three phase connections of the converter, may also be part of this coupling. Such a configuration is described in German Published Patent Application No. 10 2007 022 503, mentioned above, which is expressly incorporated herein in its entirety by reference thereto.

The star point formed by the converter is routed back to the line filter, for example. In addition, both the line filter and the converter are connected to the same ground connection. As was previously described, the converter is connected to the ground connection via the high-frequency line filter.

Further features and aspects of example embodiments of the present invention are described in more detail below with reference to the appended Figures.

DETAILED DESCRIPTION

Figure 1:
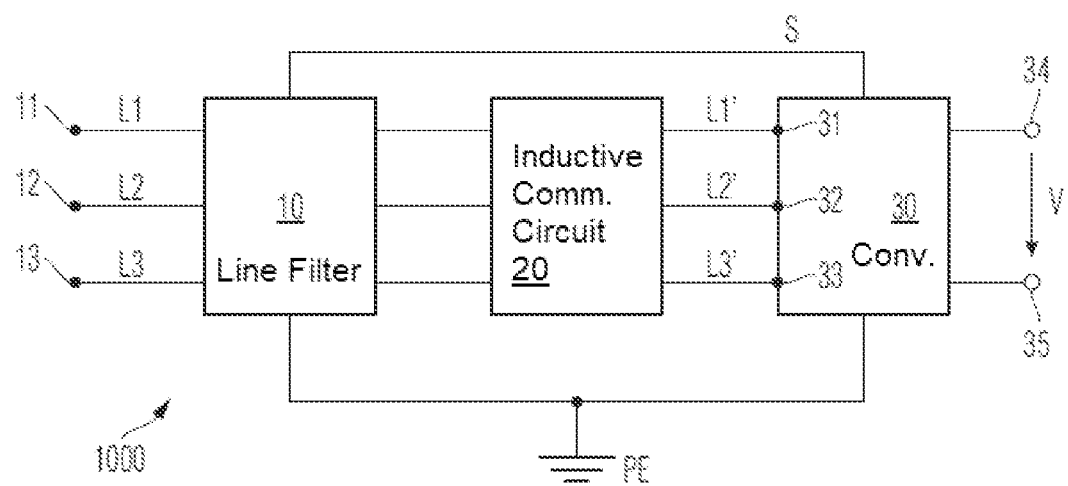
FIG. 1 is a schematic circuit diagram of a converter network.

FIG. 1 is a schematic block diagram of a converter network 1000. A three-phase alternating signal L1, L2, L3 is supplied at supply connections L1, L2 and L3 of a supply network. This three-phase alternating signal L1, L2, L3, or in other words the system voltage, is routed to a line filter 10. Connected downstream from line filter 10 is an inductive commutation circuit 20, which supplies a filtered three-phase alternating signal L1', L2', L3' to a converter 30 at its three phase connections 31, 32 and 33.

Converter 30 transforms this alternating signal L1', L2', L3' into an output signal V and makes output signal V available at output connections 34, 35. Converter 30 provides the conversion function on the basis of a power electronic circuit in which at least one power semiconductor switch such as a MOSFET or an IGBT is operated at a switching frequency. The switching frequency may be in a range of a few kHz. However, the particular power electronic topology of converter 30 described herein should not be considered to limit the spirit and scope hereof.

For example, converter 30 is a regenerative rectifier, e.g., a regenerative step-up converter. In this regard, converter 30 generates output signal V in the form of a direct voltage that is considerably above the voltage that would be possible while using a passive (i.e., unswitched) rectification of system voltage L1, L2, L3. Output signal V is a direct voltage of 650V, for example.

This output signal V is able to be supplied to a direct-voltage intermediate circuit to which a further converter is connected downstream, which converts the direct-voltage signal of the direct-voltage intermediate circuit into an alternating signal for a motor.

A star point S formed by converter 30 is routed back to line filter 10. Line filter 10 and converter 30 are connected to a common ground connection PE (protective earth).

A configuration as schematically illustrated in FIG. 1 is similar to that described, for example, in German Published Patent Application No. 10 2007 022 503.

Figure 2:
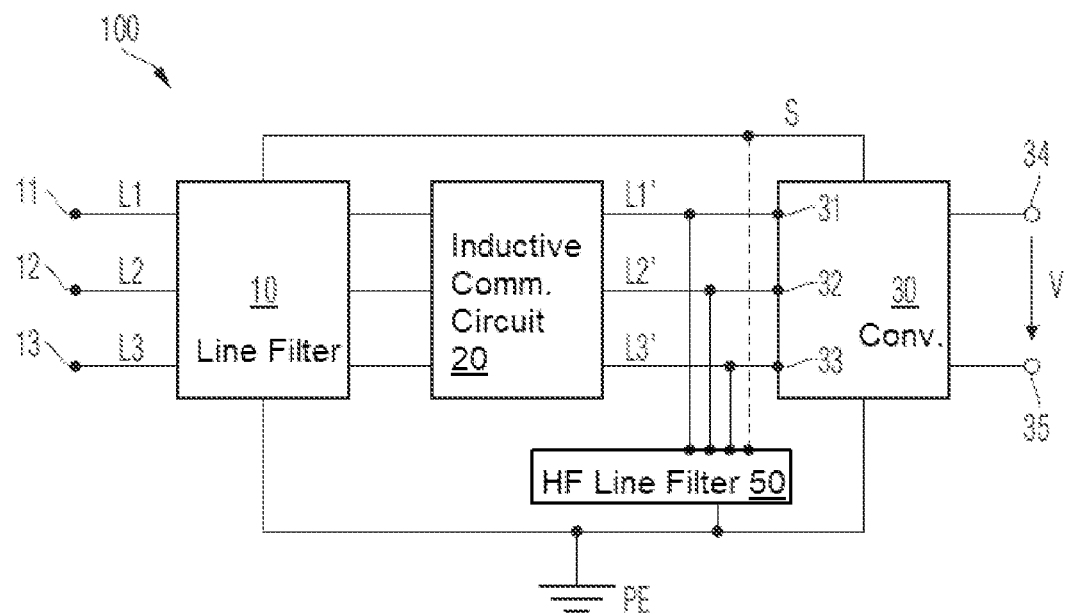
FIG. 2 is a schematic block diagram of a converter network.

According to example embodiments of the present invention, an additional high-frequency line filter 50 is provided in the converter network 100 illustrated in FIG. 2 in order to improve the electromagnetic compatibility. Apart from high-frequency line filter 50, converter network 100 may substantially be configured as in the converter network 1000. However, configurations in which commutation circuit 20 is implemented in converter 30 are possible as well.

High-frequency line filter 50 may be provided in close proximity to converter 30 because the converter, due to the high-frequency operation of the power electronic switches, is the source of the interference that is not to be coupled into the supply network.

High-frequency line filter 50 is connected to the three phase connections 31, 32, and 33 of converter 30 and couples them to ground connection PE. High-frequency line filter 50 is arranged entirely outside converter 30, is entirely integrated into converter 30, or is partially integrated into converter 30 and partially provided outside converter 30.

The following comments pertain to a three-phase converter which receives a three-phase alternating signal from the supply network or feeds a three-phase alternating signal into the supply network. As mentioned above, however, the converter may also be arranged as a single-phase converter or as a multi-phase converter, which receives or supplies more or fewer than three phases.

An exemplary high-frequency line filter 50 is described below with reference to FIG. 3.

Figure 3:
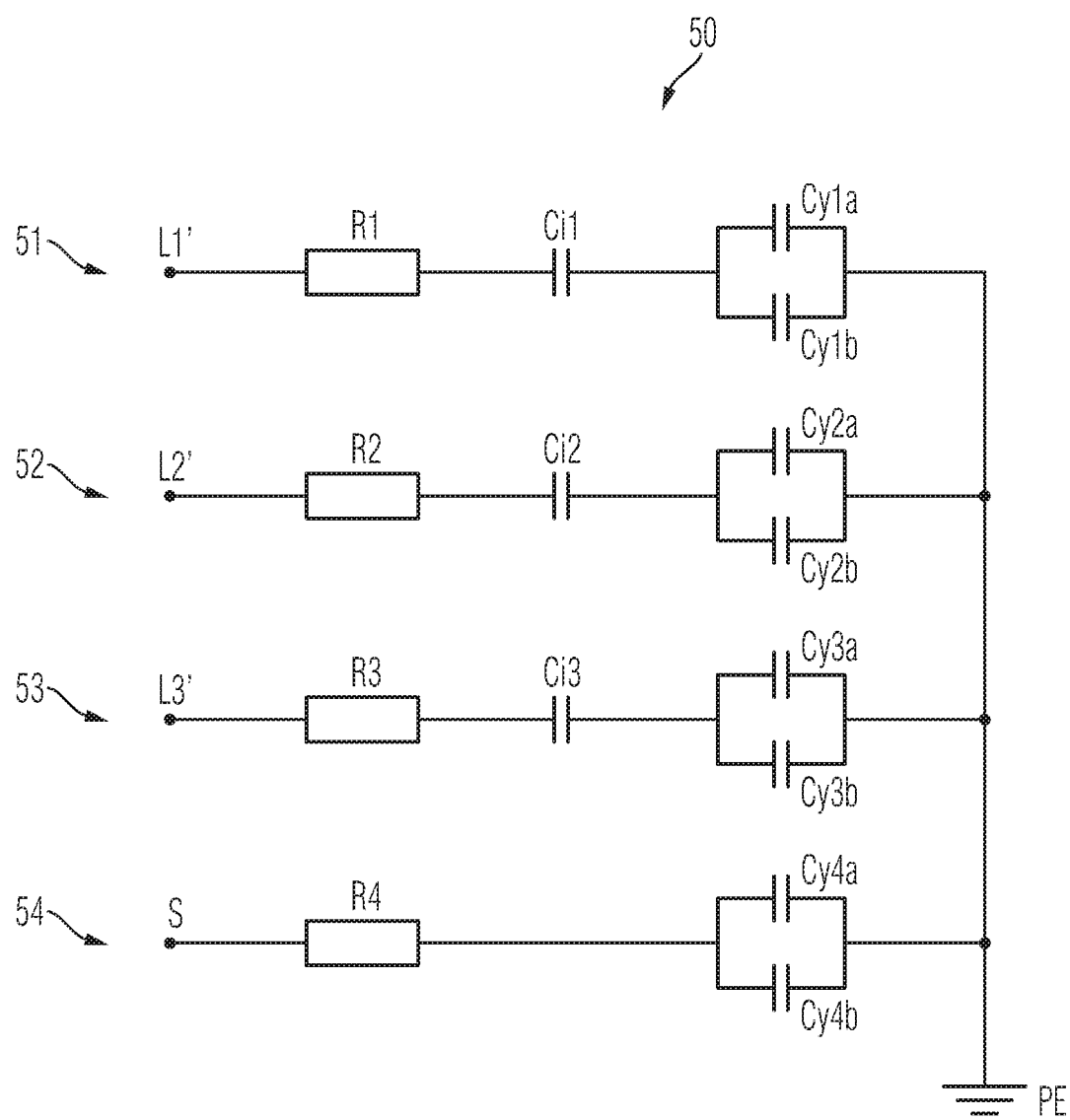
FIG. 3 is a schematic block diagram of a high-frequency line filter.

As illustrated in FIG. 3, the high-frequency line filter has four filter paths 51 to 54. A first filter path 51 establishes a conductive connection between first phase connection 31 and ground connection PE. A second filter path 52 establishes a conductive connection between second phase connection 32 of converter 30 and ground connection PE. A third filter path 53 establishes a conductive connection between third phase connection 33 of converter 30 and ground connection PE, and an optionally provided fourth filter path 54 establishes a conductive connection between star point S and ground connection PE. In the case of a single-phase converter, third filter path 53 and also fourth filter path 54 would be omitted (provided no star point S is present). Only first phase connection 31 would then be connected to ground connection PE via first filter path 51, and second phase connection 32 (which, for example, receives the signal of a neutral conductor instead of a further phase in this case; the single-phase alternating signal then being applied between phase connections 31 and 32) would be connected to ground connection PE via second filter path 52.

First three filter paths 51 to 53 include a series connection made up of a pulse-proof capacitor Ci1, Ci2, Ci3 and a parallel connection of at least two Y capacitors Cy1a and Cy1b, Cy2a and Cy2b, Cy3a and Cy3b in each case.

Fourth filter path 54 includes no pulse-proof capacitor but a parallel connection of at least two Y capacitors Cy4a and Cy4b. All Y capacitors Cy1a, Cy1b, Cy2a, Cy2b, Cy3a, Cy3b, Cy4a, and Cy4b may be arranged outside the converter housing and bridge an insulation of converter 30.

Each one of the four filter paths 51 to 54 includes an ohmic damping resistor R1, R2, R3, R4, which is connected in series and has a resistance value of a few ohm, e.g., in a range of 2 to 8 ohm or 3 to 7 ohm. The respective damping resistor R1, R2, R3, R4 is adapted to attenuate an oscillation in the kilohertz range and in the megahertz range. It has a resistance value of 4.7 ohm, for example.

Damping resistors R1, R2, R3, R4 are arranged as pulse-proof resistors, for example.

Pulse-proof capacitors Ci1 to Ci3 each have a capacitance of a few nF, e.g., 2.2 nF. Y capacitors Cy1a, Cy1b, Cy2a, Cy2b, Cy3a, Cy3b, Cy4a, and Cy4b also have a capacitance of a few nF, e.g., 3.3 nF.

In an effort to reduce the current through a respective Y capacitor Cy1a, Cy1b, Cy2a, Cy2b, Cy3a, Cy3b, Cy4a, Cy4b, it is also possible to provide more than two Y capacitors in the respective parallel circuit. All Y capacitors may furthermore be of the same type and may have the same capacitance.

For example, Y capacitors Cy1a, Cy1b, Cy2a, Cy2b, Cy3a, Cy3b, Cy4a, and Cy4b bridge an insulation of converter 30. Pulse-proof capacitors Ci1 to Ci3 are provided because of the high-frequency (square-wave) pulses that may originate from converter 30. Since the amplitude of these pulses at star point S are usually considerably lower than at phase connections 31 to 33, a pulse-proof capacitor is not necessarily required in fourth filter path 54.

Currents having an amplitude of up to a few 10 A may occur in first three filter paths 51 to 53, these currents being distributed in the respective parallel circuits to the at least two Y capacitors Cy1a, Cy1b, Cy2a, Cy2b, Cy3a, Cy3b. In fourth filter path 54, the occurring pulse energy is distributed to the at least two Y capacitors Cy4a and Cy4b. Y capacitors Cy1a, Cy1b, Cy2a, Cy2b, Cy3a, Cy3b, Cy4a, Cy4b are therefore able to be operated within their specification.

With a relatively low outlay in terms of components, high-frequency line filter 50 makes it possible to filter possible square-wave pulses having an amplitude of multiple 100V and a frequency of multiple kilohertz with respect to ground. In particular, high-frequency line filter 50 may be arranged without interconnected inductors yet still limit the pulse currents generated by the square-wave voltages. The pulse current flowing through a single Y capacitor is distributed by the network of capacitors to a plurality of Y capacitors and restricted by the series connection of a pulse-proof capacitor and a damping resistor. The total capacitance required for the filter effect is able to be achieved by the corresponding selection of individual capacitors.

It is optionally possible to provide discharge resistors in filter paths 51 to 54, as described in greater detail below with reference to FIGS. 4 and 5.

Figure 4:
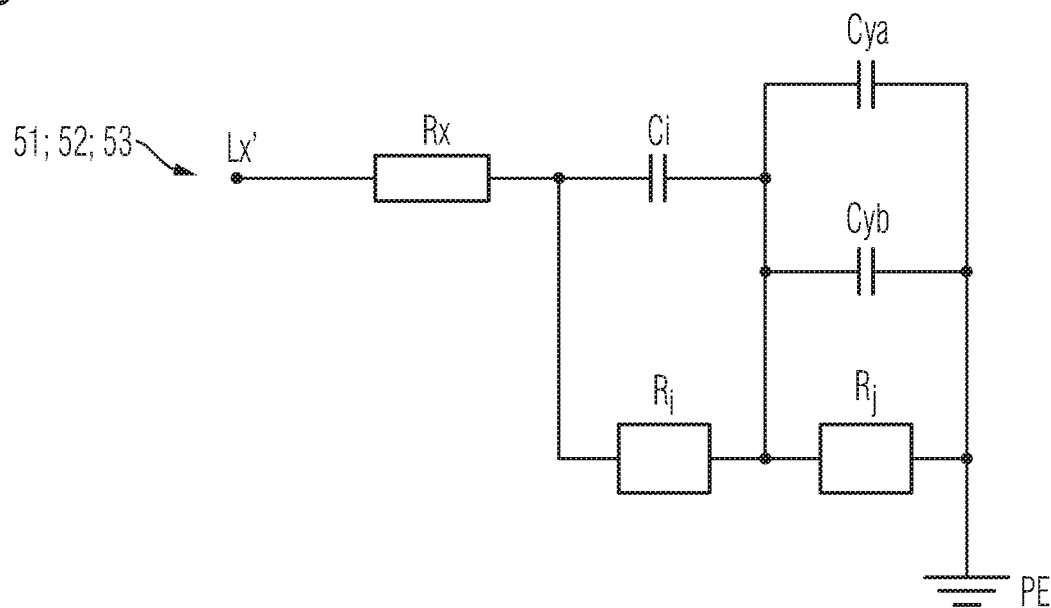
FIG. 4 schematically illustrates a filter path of a high-frequency line filter.
Figure 5:
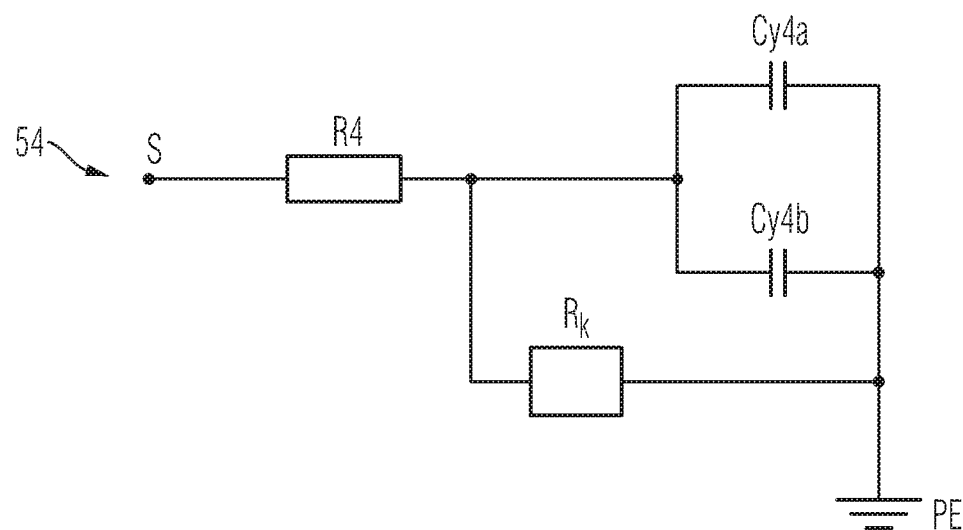
FIG. 5 schematically illustrates a further filter path of a high-frequency line filter.

Representative of each one of first filter paths 51, 52, and 53, FIG. 4 illustrates a filter path provided with such discharge resistors. Each one of the first three filter paths 51, 52, and 53 may be arranged as illustrated in FIG. 4. A first discharge resistor $R_j$, which has a resistance value in the range of a few 100 kΩ, for example, is connected in parallel with the parallel circuit of the at least two Y capacitors Cya, Cyb. A. A second discharge resistor $R_i$, e.g. having a resistance value in the range of a few 100 kΩ, is arranged in parallel with pulse capacitors Ci.

In a similar manner, a discharge resistor $R_k$ may be provided in parallel with Y capacitors Cy4a and Cy4b connected in parallel, discharge resistor $R_k$ having a resistance value in the range of a few 100 kΩ, for example.

However, discharge resistors $R_i$, $R_j$ and $R_k$ are not required for the filter effect of high-frequency line filter 50. They are arranged primarily to discharge the capacitors to which they are connected in parallel after converter network 100 has been separated from the grid, so that a user is able to open the housing of converter 30 without any risk, e.g., no later than a few minutes after the separation from the grid.

What is claimed is:

1. A high-frequency line filter for a converter having three phase connections adapted to receive a three-phase alternating signal from a three-phase voltage network and adapted to convert the received three-phase alternating signal into an output signal for a load, comprising:
    a first filter path adapted to establish a conductive connection between a first phase connection of the three phase connections and a ground connection;
    a second filter path adapted to establish a conductive connection between a second phase connection of the three phase connections and the ground connection;
    a third filter path adapted to establish a conductive connection between a third phase connection of the three phase connections and the ground connection; and
    a fourth filter path adapted to establish a conductive connection between a star point formed by the converter and the ground connection, the fourth filter path including a series connection of (a) an ohmic damping resistor and (b) a parallel connection of at least two Y capacitors;
    wherein each of the first filter path, the second filter path, and the third filter path includes a series connection of (a) a pulse-proof capacitor not approved for bridging insulation and (b) a parallel connection of at least two Y capacitors approved for bridging insulation; and
    wherein the fourth filter path does not include a pulse-proof capacitor.

2. The high-frequency line filter according to claim 1, wherein each of the first filter path, the second filter path, and the third filter path includes an ohmic damping resistor having a resistance value of 10 to 100 arranged in series with the pulse-proof capacitor.

3. The high-frequency line filter according to claim 1, wherein each filter path includes an ohmic discharge resistor arranged in parallel with the Y capacitors.

4. The high-frequency line filter according to claim 1, wherein each of the first filter path, the second filter path, and the third filter path includes an ohmic discharge resistor arranged in parallel with the pulse-proof capacitor.

5. The high-frequency line filter according to claim 1, wherein each of the first filter path, the second filter path, and the third filter path includes a first ohmic discharge resistor arranged in parallel with the Y capacitors and a second ohmic discharge resistor arranged in parallel with the pulse-proof capacitor.

6. The high-frequency line filter according to claim 1, wherein the fourth filter path includes a discharge resistor arranged in parallel with the Y capacitors.

7. The high-frequency line filter according to claim 1, wherein the pulse-proof capacitors have a capacitance between 1 nF and 10 nF.

8. The high-frequency line filter according to claim 1, wherein the Y capacitors have a capacitance between 1 nF and 10 nF.

9. The high-frequency line filter according to claim 1, wherein the Y capacitors arranged in each parallel connection have the same capacitance.

10. The high-frequency line filter according to claim 1, wherein the high-frequency line filter has no interconnected inductor.

11. A converter network, comprising:
   a converter; and
   a high-frequency line filter connected to the converter;
   wherein the converter includes three phase connections adapted to receive a three-phase alternating signal from a three-phase voltage network and adapted to convert the received three-phase alternating signal into an output signal for a load, and the high-frequency line filter includes:
      a first filter path adapted to establish a conductive connection between a first phase connection of the three phase connections and a ground connection;
      a second filter path adapted to establish a conductive connection between a second phase connection of the three phase connections and the ground connection;
      a third filter path adapted to establish a conductive connection between a third phase connection of the three phase connections and the ground connection; and
      a fourth filter path adapted to establish a conductive connection between a star point formed by the converter and the ground connection, the fourth filter path including a series connection of (a) an ohmic damping resistor and (b) a parallel connection of at least two Y capacitors;
   wherein each of the first filter path, the second filter path, and the third filter path includes a series connection of (a) a pulse-proof capacitor not approved for bridging insulation and (b) a parallel connection of at least two Y capacitors approved for bridging insulation; and
   wherein the fourth filter path does not include a pulse-proof capacitor.

12. The converter network according to claim 11, further comprising a second line filter adapted to form a coupling between the voltage network and the phase connections of the converter.

13. The converter network according to claim 12, further comprising an inductive commutation circuit connected between the second line filter and the phase connections of the converter.

14. The converter network according to claim 12, wherein a star point formed by the converter is connected to the second line filter, and wherein and both the converter and the second line filter are connected to the ground connection.

15. The converter network according to claim 11, wherein the converter is arranged as a regenerative rectifier.

* * * * *